United States Patent

Tutumi

[11] Patent Number: 4,850,218
[45] Date of Patent: Jul. 25, 1989

[54] DEVICE FOR MEASURING AMOUNT OF ENGINE SUCTION AIR

[75] Inventor: Kazumichi Tutumi, Hyogo, Japan

[73] Assignee: Mitsubishi Denki Kabushiki Kaisha, Tokyo, Japan

[21] Appl. No.: 167,224

[22] Filed: Mar. 11, 1988

[30] Foreign Application Priority Data

Mar. 19, 1987 [JP] Japan .................................. 62-64903

[51] Int. Cl.$^4$ .......................................... G01M 19/00
[52] U.S. Cl. .................................................. 73/118.2
[58] Field of Search ............. 73/118.2, 861.22, 861.24, 73/861.23; 364/510

[56] References Cited

U.S. PATENT DOCUMENTS 4,270,391  6/1981  Herzl ................................ 73/861.22
4,457,166  7/1984  Kobayashi ....................... 73/861.22

*Primary Examiner*—Stewart J. Levy
*Assistant Examiner*—Robert R. Raevis
*Attorney, Agent, or Firm*—Sughrue, Mion, Zinn, Macpeak and Seas

[57] ABSTRACT

A measuring device for measuring an amount of suction air of an engine comprises a Kármán vortex sensor disposed in an engine suction conduit, a low-pass filter for removing high frequency noise component from an output of the Kármán vortex sensor, a first binarizing means for comparing an output of the low-pass filter with a predetermined value to provide a series of Kármán vortex pulses, a second binarizing means for comparing the output of the sensor with a predetermined value to provide a series of Kármán vortex pulses and a noise detector for comparing the number of pulses from the first binarizing means with that from the second binarizing means to judge an existence of high frequency noise of the output of the sensor, upon which a time constant of the low-pass filter is switched to exclude noise from the output of the Kármán vortex sensor when a throttle opening of the engine is small.

3 Claims, 2 Drawing Sheets

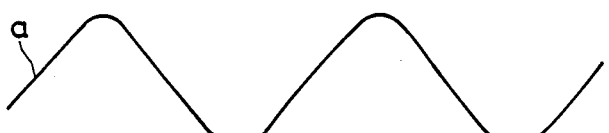
FIG. 3(A)
FIG. 3(B)
FIG. 3(C)
FIG. 3(D)
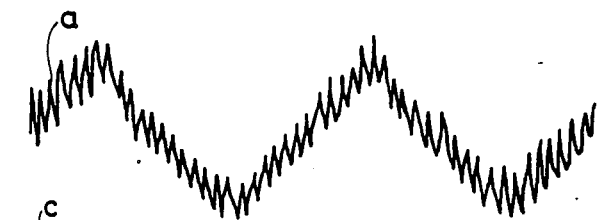
FIG. 4(A)
FIG. 4(B)
FIG. 4(C)
FIG. 4(D)

DEVICE FOR MEASURING AMOUNT OF ENGINE SUCTION AIR

BACKGROUND OF THE INVENTION

The present invention relates to a device for measuring an amount of engine suction air in which an amount of air is measured by a Karman vortex sensor.

A variety of measuring methods in which an amount of flowing fluid is measured on the basis of a frequency of occurence of Karman vortexes produced downstream of a vortex generator provided in a conduit have been known in such as Japanese Utility Model Laid-Open Nos. 41665/1979 and 160625/1982.

In No. 41665/1979, the fact that ultrasonic signal wave transmitted and received through a flow passage is phase-modulated by Karman vortex generated in fluid flowing through the passage is utilized and, in No. 160625/1982, the fact that a resistance value of a thermister arranged in a flow passage and heated by a constant electric current varies according to Karman vortex is utilized.

In either of these conventional techniques, an output signal obtained is an analog electric signal which varies correspondingly to Karman vortex. When such technique is used as a suction air sensor for an engine fuel injection control, such output signal is "binarized" (converted from an analog signal into a two level digital signal) into a series of Karman vortex pulses a frequency of which is a frequency of occurrence of Karman vortex.

The conversion of the analog signal into the series of pulses is usually performed by comparing in a voltage comparator, the analog signal with a predetermined reference voltage, as shown in, for example, Japanese Patent Application Laid-Open No. 70131/1983.

In such Karman vortex sensor as applied to an engine as a suction air sensor, there is a problem that, when an opening degree of a throttle valve of the engine is low and thus suction air passes through the valve at high speed, the so-called "wind noise" is produced which affects the Karman vortex sensor in a suction conduit, causing its output to be overlapped with high frequency noise.

When such output signal is binarized according to the teaching of No. 70131/1983, the high frequency noise is also pulsed, causing subsequent signal processing difficulties.

SUMMARY OF THE INVENTION

An object of the present invention is to provide a device for measuring an amount of suction air which is capable of outputting a series of Karman vortex pulses having always true value regardless of noise generated in an engine suction system.

The measuring device according to the present invention comprises a Karman vortex sensor disposed in an engine suction conduit, a low-pass filter for removing high frequency noise component from an output of the Karman vortex sensor, a first binarizing means for comparing an output of the low-pass filter with a predetermined value to provide a series of Karman vortex pulses, a second binarizing means for comparing the output of the sensor with a predetermined value to provide a series of Karman vortex pulses, and a noise detector for comparing the number of pulses from the first binarizing means with that from the second binarizing means to judge the existence of high frequency noise in the output of the sensor.

In the present invention, a time constant of the low-pass filter is changed according to the judgment performed by the noise detector.

BRIEF DESCRIPTION OF THE DRAWING

FIGS. 3A to 3D and 4A to 4D are timing charts of waveforms at various points in the embodiment in FIG. 1.

DETAILED DESCRIPTION OF THE PREFERRED EMBODIMENT

Figure 1:
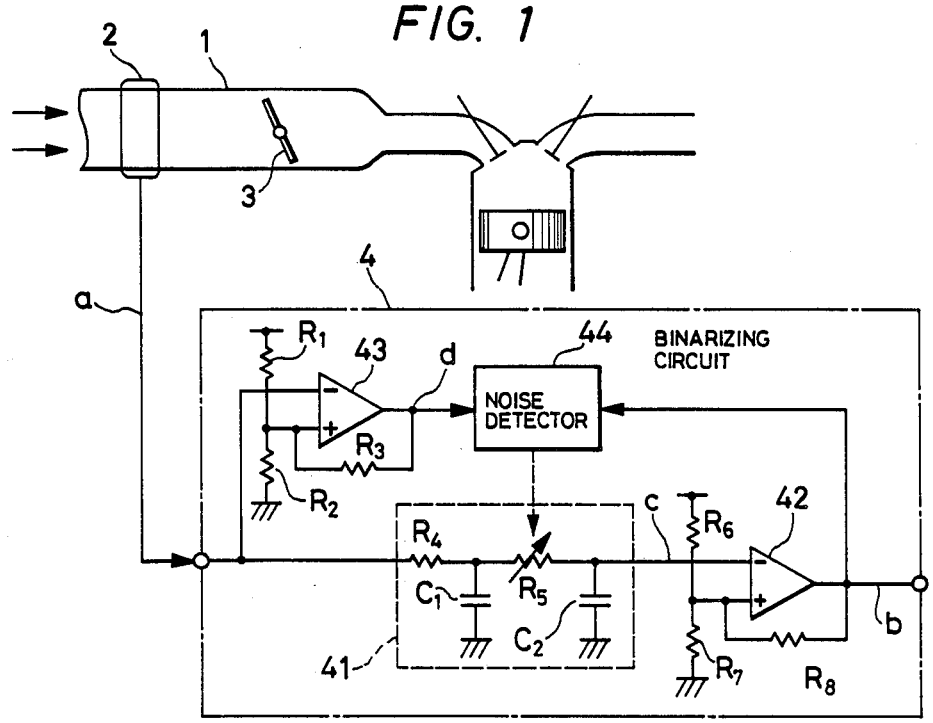
FIG. 1 is a block circuit diagram of an embodiment of a measuring device of engine suction air according to the present invention.

In FIG. 1 which is a block circuit diagram showing a Karman vortex sensor and binarizing means for binarizing an output of the sensor to obtain a series of Karman vortex pulses, the Karman vortex sensor 2 is disposed in an engine suction conduit 1 and a throttle valve 3 is disposed in the conduit at a downstream position thereof. A reference numeral 4 depicts a binarizing circuit for binarizing an output a of the Karman vortex sensor 2 to obtain a series of Karman vortex pulses b.

The binarizing circuit 4 comprises a low-pass filter 41 composed of a pair of series connected RC circuits for attenuating high frequency noise component of the sensor output a, a first comparator 42 constituting a binarizing means for comparing an output c of the low-pass filter 41 with a predetermined voltage with a predetermined hysterisis width to obtain Karman pulses b, a second comparator 43 constituting a binarizing means for comparing an input of the low-pass filter 41 with a predetermined voltage with a predetermined hysterisis width as in the first comparator 42 to obtain a series of Karman vortex pulses d, and a noise detector 44 for comparing the number of Karman vortex pulses b obtained by the first comparator 42 with that from the second comparator 43 to judge an existence of the noise component.

The output a of the Karman vortex sensor 2 is applied to a (−) input terminal of the second comparator 43 whose (+) terminal is connected to a junction of a series circuit of resistors R1 and R2 which is connected between a power source and a grounding point so that a predetermined reference voltage is applied to the (+) terminal of the comparator 43. A resistor R3 is connected between an output terminal and the (+) input terminal of the second comparator 43.

The output a of the sensor 2 is also supplied to the low-pass filter 41 which comprises a first RC circuit composed of a resistor R4 and a capacitor C1 and a second RC circuit composed of a variable resistor R5 and a capacitor C2.

The output c of the low-pass filter 41 is supplied to a (−) input terminal of the first comparator 42 whose (+) input terminal is connected to a junction of resistors R6 and R7 so that a predetermined reference voltage is applied thereto. A resistor R8 is connected between the (+) input terminal and an output terminal of the second comparator 43.

The outputs b and d of the first and the second comparators 42 and 43 are supplied to input terminals of the noise detector 44, respectively. A value of the variable resistor R5 of the low-pass filter 41 is varied according to an output of the noise detector 44 to vary a time constant of the second RC circuit thereof.

Although, in this embodiment, the binarizing circuit 4 is described as an analog circuit for simplicity of explanation, it is possible to use a micro processor for construction of the device shown in FIG. 1.

Figure 2:
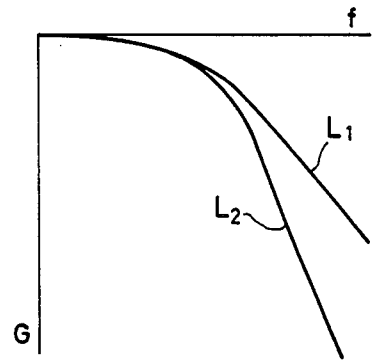
FIG. 2 is a graph showing the frequency characteristics of a low-pass filter used in the embodiment shown in FIG. 1.

An operation of this embodiment will be described with reference to FIG. 2 which is a filter characteristic showing a relation between an input frequency f and a damping factor G ( G =(output amplitude)/(input amplitude)) of the low-pass filter 41. As shown in FIG. 2, the frequency characteristics of damping factor G of the low-pass filter 41 can be switched between two curves according to a result of judgment performed by the noise detector.

That is, the damping factor G of the low-pass filter 41 is shown by a curve L1 when the noise detector 44 provides the output indicative of absence of noise and it is switched to a curve L2 when the detector output indicates a presence of noise, to attenuate the high frequency noise component sufficiently.

The Karman vortex sensor 2 disposed in the engine suction conduit 1 provides the sensor output a which is an analog electric signal having frequency proportional to a flow rate of air passing through the conduit 1.

Waveform of the output signal in normal state, i.e., when no high frequency noise is contained therein, is substantially sinusoidal as shown in FIG. 3A and that when high frequency noise is included becomes as shown in FIG. 4A.

The outputs c obtained by passing the outputs a of the sensor 2 through the low-pass filter 41 become as shown in FIGS. 3B and 4B, respectively. The output waveform c of the low-pass filter 41 in FIG. 4B indicates a state where the noise detector 44 does not provide a positive judgment for noise. Therefore, the damping factor G of the low-pass filter 41 is set on the frequency characteristic curve L1, so that high frequency noise removal is not sufficient.

When the output and input of the low-pass filter 41 are binarized by the comparators 42 and 43, respectively, Karman vortex pulses b and d are obtained as shown in FIGS. 3C and 3D and FIGS. 4C and 4D, respectively. The pulses b and d shown in FIGS. 3C and 3D do not include high frequency noise and the input waveform a of the low-pass filter 41 shown in FIG. 3A is analogous to the output waveform c shown in FIG. 3B. Therefore, the Karman vortex pulses b and d obtained by binarizing these waveforms have the same waveform as shown in FIGS. 3C and 3D, respectively.

On the other hand, in FIGS. 4A to 4D in which high frequency noise is overlapped, the Karman vortex pulse signal d obtained by binarizing it includes noise pulses as shown in FIG. 4D.

Further, since the noise component of the output c after passing through the low-pass filter 41 is not removed sufficiently, the Karman vortex pulse signal b obtained by binarizing it includes some noise component as shown in FIG. 4C. However, since the noise component is attenuated to some constant extent by the low-pass filter 41, the number of noise pulses included in the Karman vortex pulse signal b obtained by the first comparator 42 is sufficiently smaller than that included in the Karman vortex pulse signal d.

An operation of the noise detector 44 is based on a detection of a difference in number of noise pulses between when high frequency noise is introduced and when no high frequency noise is introduced. First, the number N of Karman vortex pulses d obtained by the second comparator 43 for a time period corresponding to one period of Karman vortex pulse signal b obtained by the first comparator 42 is counted. The number N=1 when no high frequency noise exists, since the waveforms b and d are the same as mentioned previously.

Then, when high frequency noise exists, the number of pulses of the Karman vortex pulse signal d becomes larger than that of the Karman vortex pulse signal b and the number N may become 2 or more. Therefore, when a condition $N \geq 4$ is established, for example, the noise detector 44 sets a noise flag.

Then, when the noise disappears, N returns to 1, again, and the noise detector 44 resets the flag if the state of N=1 continues for a time corresponding to, for example, six Karman vortex pulses b.

Thus, the noise flag is set when noise is overlapped with the sensor output a and reset when noise disappears. During a time for which the flag is set, the damping factor G of the low-pass filter 44 is set to the characteristic curve L2 and as a result, high frequency noise is attenuated sufficiently to exclude noise pulses from the Karman vortex pulse signal b completely.

There may be a possibility of inclusion of noise pulses in the Karman vortex pulse signal b during a time from an introduction of noise to a setting of the flag. However, since such time is very short and the number of such noise pulses may be small, such problem is not serious practically so long as the measurement of engine suction air is concerned.

As mentioned hereinbefore, according to the present invention, an output of a Karman vortex sensor is passed through a low-pass filter whose output is processed by a first binarizing means to obtain a Karman vortex pulse signal which is counted by a noise detector together with a Karman vortex pulse signal obtained by processing the sensor output by a second binarizing means to judge an existence of high frequency noise. The time constant of the low-pass filter is switched according to the judgment to remove noise so that noise component is always removed. Therefore, it is possible to provide a Karman vortex pulse signal containing no noise even when a throttle opening of an engine is small.

I claim:

1. A measuring device for measuring an amount of suction air of an engine, comprising: a Karman vortex sensor (2) disposed in an engine suction conduit (1), a low-pass filter (41) for removing high frequency noise components from an output of the Karman vortex sensor, a first binarizing means (42) for comparing an output of the low-pass filter with a predetermined value to provide a series of Karman vortex pulses, a second binarizing means (43) for comparing the output of the sensor with a predetermined value to provide a series of Karman vortex pulses, and a noise detector (44) for comparing the number of pulses from the first binarizing means with that from the second binarizing means to judge an existence of high frequency noise in the output of the sensor, a time constant of said low-pass filter being changed according to a judgment performed by said noise detector.

2. The measuring device as claimed in claim 1, wherein said low-pass filter comprises a first RC circuit and a second RC circuit connected in series to said first RC circuit, one of said RC circuits including a variable resistor.

3. The measuring device as claimed in claim 2, wherein each of said first and said second binarizing means comprises a comparator.

* * * * *